United States Patent Office 3,317,832
Patented May 2, 1967

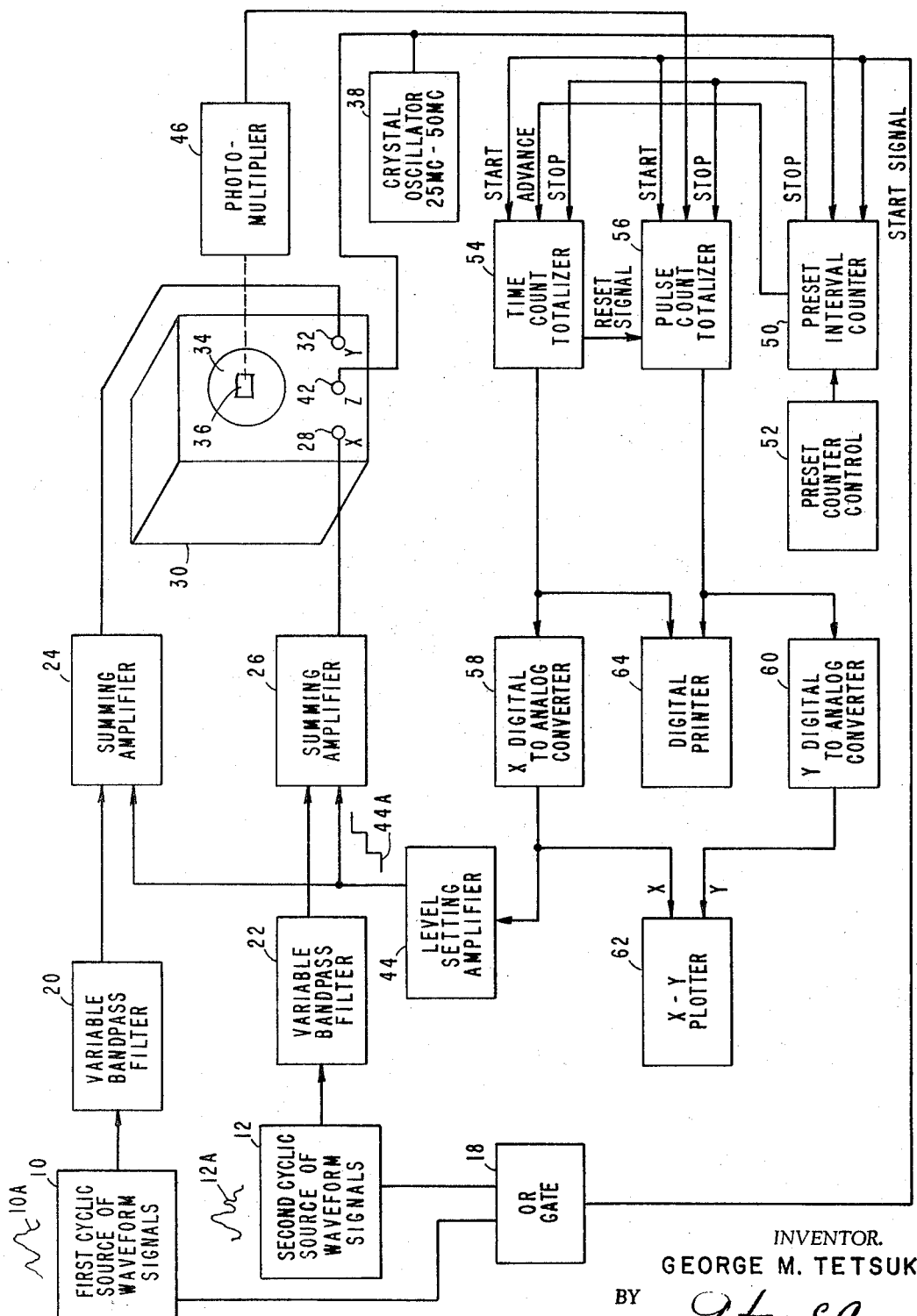

3,317,832
SINGLE OR JOINT AMPLITUDE DISTRIBUTION ANALYZER
James E. Webb, Administrator of the National Aeronautics and Space Administration, with respect to an invention of George M. Tetsuka, Monterey Park, Calif.
Filed May 21, 1964, Ser. No. 369,336
9 Claims. (Cl. 324—77)

This invention relates to equipment for analyzing electrical wave forms which represent the amplitude distribution of a time function and more particularly, to improvements therein.

The invention described herein was made in the performance of work under a NASA contract and is subject to the provisions of Section 305 of The National Aeronautics and Space Act of 1958, Public Law 85-568 (72 Stat. 435; U.S.C. 2457).

The amplitude distribution of the time function, usually represented by an electrical wave form, is unique mainly because it cannot, in general, be derived from any other parameter, such as frequency distribution, correlation function, or spectrum density information. In practice, amplitude distribution of a time function over a practical time period is analyzed by measurement of how long the function stays at a given amplitude over a given time period.

An object of this invention is the provision of a novel arrangement for measuring the amplitude distribution of a time function.

Yet another object of the present invention is the provision of an arrangement for enabling measurement of the amplitude distribution of time functions extremely accurately.

Still another object of the present invention is the provision of an arrangement which can analyze two data flows comprising the amplitude distribution of two time functions, simultaneously, to obtain the joint amplitude distribution characteristics.

These and other objects of this invention are achieved employing a cathode ray oscilloscope having all of the face of the oscilloscope tube masked except for a centrally located aperture. An electrical signal having a waveform representative of the amplitude distribution of a time function is repetitively applied to the cathode ray oscilloscope, and each time it is applied it is combined with another step of a stair-step voltage. The electron beam of the cathode ray oscilloscope is biased on only in response to clock pulses generated at a predetermined frequency by a crystal oscillator. As a result, a light pulse is seen through the hole in the mask on the cathode ray tube over the duration of a step of the stair-step voltage only when the waveform amplitude together with the step amplitude is such as to position the cathode ray pulsed beam in the window.

The duration of a step of the stair-step waveform as well as the successive amplitude levels thereof are established in a predetermined manner employing counters. The same oscillator which applies the clock pulses to the cathode ray oscilloscope beam is employed as a time base for the operation of these counters. The light pulses which are displayed on the cathode ray tube face are detected by photomultiplier apparatus which applies the electrical pulses generated in response to the light pulses to another counter to be totalized over the interval of a stair-step of the stair-step voltage. Print out apparatus is provided which responds to the counts in the two counters to provide both a digital and an analog presentation of the amplitude distribution information. Two waveforms may be analyzed jointly by applying them to the two coordinate deflectors of the cathode ray oscilloscope.

The novel features that are considered characteristic of this invention are set forth with particularity in the appended claims. The invention itself both as to its organization and method of operation, as well as additional objects and advantages thereof, will best be understood from the following description when read in connection with the accompanying drawing, which is a block schematic diagram of an embodiment of the invention.

In accordance with this invention, a waveform to be analyzed is recorded in a manner so that it may be cyclically repeated. Apparatus for doing this is well known. It may comprise, for example, a magnetic drum, or magnetic tape in loop form, or a magnetic disc or a digital loop. Apparatus of this type is represented in the drawing by the respective rectangles 10, 12 which are respectively labeled first cyclic source of waveform signals and second cyclic source of waveform signals. Assume that the first and second signal sources contain not only recordings of the waveforms desired to be analyzed, but in addition a recording of a start signal. The output of the first cyclic source comprises electrical signals representative of a waveform such as 10A which are repetitively applied to a variable band pass filter 20. The output of the second cyclic source comprises electrical signals representative of a waveform, such as 12A, which are repetitively applied to a variable band pass filter 22.

In order to define the frequency spread of the data to be analyzed from the first cyclic source of waveform signals, the variable band pass filter 20 is employed. Similarly, the variable band pass filter 22 is employed for defining the frequency spread of data to be analyzed from the second cyclic source of waveform signals. The output of the variable band pass filter is connected to a summing amplifier 24, and the output of the variable band pass filter 22 is connected to a summing amplifier 26. The output of the summing amplifier 26 is connected to the terminal 28, which is the input to the $x$-coordinate deflectors of the cathode ray oscilloscope apparatus 30. The output of the summing amplifier 24 is connected to the terminal 32 which is the input to the $y$-coordinate deflectors of the cathode ray oscilloscope apparatus 30.

The face of the cathode ray tube, which is in the cathode ray oscilloscope 30, is covered by a mask 34, which has a small square aperture 36 at the center thereof. The size of the square opening is determined to a large extent by the number of measuring steps desired in a stair-step voltage waveform which is used, as will become clear from the explanation which follows. Further, the separation obtainable between the desired number of steps to enable an accurate reading as well as the minimum detectable spot size are also considerations. In an embodiment of the invention which was built, a five-inch cathode ray tube was employed and a mask with a one centimeter square rectangular aperture was used. A stable crystal oscillator 38 generates clock pulses at a predetermined frequency. In an embodiment of the invention which was built, the frequency of the crystal oscillator was varied as required between 25 and 50 megacycles, in accordance with a desired clock frequency rate. The output of the crystal oscillator is applied to the terminal 42 of the cathode ray oscilloscope 30 which comprises the input to the $z$-axis of the cathode ray tube oscilloscope. The $z$-axis, as is well known, enables control of the cathode ray beam whereby it is turned on or intensified only in the presence of a pulse from the crystal oscillator.

By way of providing an understanding of the operation of the system described thus far, assume that a stair-step voltage, such as 44A, is applied, by the level setting amplifier 44, to the second input to the respective summing amplifiers 24, 26. The duration or interval of each step can be made equal to the time required for a complete reproduction of electrical signals representative of the wave shapes 10A, 12A at the outputs of the first and second cyclic sources of waveform signals. Now considering, for simplicity, the output of the summing amplifier 24, when the stair-step voltage 44A is zero, over the first cycle. Light pulses will be seen in the aperture 36 only for those amplitudes of the waveform 10A which can deflect the cathode ray beam up to the region of the cathode ray tube screen which is exposed by the aperture 36. These are the largest amplitude portions of the wave shape 10A.

On the first step or voltage level of the stair-step voltage 44A, the output of the summing amplifier 24 will be the combination or addition of its inputs. As a result of this addition, light pulses will be produced corresponding to lower amplitude portions of the wave shape 10A since, by the addition of the first step voltage, the top portions of the wave shape 10A have their amplitudes raised to a value such that the cathode ray beam is moved out from the portion of the cathode ray tube which is exposed by the opening 36.

With successive stair-step voltages being provided, the waveform 10A is effectively successively moved upward past the window aperture 36 until a complete analysis of the amplitude distribution of the wave shape 10A has occurred. A similar analysis is performed for the wave shape 12A which is applied to the x-coordinate of the cathode ray oscilloscope. When both are simultaneously applied, to the cathode ray oscilloscope, then the joint analysis of the two wave shapes may be effectuated.

In order to establish the requisite interval for the duration of a stair-step voltage, as well as to determine the number of levels to be applied to the summing amplifiers, control apparatus, including well known, commercially available preset interval counter apparatus is employed. This includes a preset interval counter 50 which is preset by means of a preset counter control 52, to count a predetermined number of counts or pulses for a predetermined number of times. The output of the oscillator 38, besides being applied to the z-axis of the cathode ray oscilloscope 30, is also applied to the preset interval counter 50 to be counted. When the preset interval counter has counted the preset number of clock pulses from the oscillator, it applies an output pulse to another counter 54 which is designated as the time count totalizer. This counter 54 has its count advanced one count each time the preset interval counter 50 counts the predetermined number of pulses. When the preset interval counter has counted these pulses, a predetermined number of times, it provides an output to the time count totalizer 54 which resets it to zero.

The photomultiplier device 46 is employed to receive the light output pulses from the cathode ray tube which appears in the aperture 36 and to provide electrical pulses representative thereof. The output of the photomultiplier 46 is applied to a pulse count totalizer 56 to be counted. Each time the time count totalizer advances its count in response to an output from the preset interval counter 50, it resets the pulse count totalizer. The pulse count totalizer then proceeds to count anew in response to the output of the photomultiplier 46. Thereby a pulse count is obtained at each voltage step which indicates how long the waveform being analyzed was at a particular level indicated by light pulses appearing in the window 36.

The output of the time count totalizer 54 is applied to a digital-to-analog converter 58 which is designated as the x-digital-to-analog converter. This digital-to-analog converter 58 provides an analog voltage output which has an amplitude representative of the count in the time count totalizer 54. The analog voltage output of the digital-to-analog converter, it will be recognized, will be a stair-step voltage since the time count totalizer 54 has its count increased successively. The output of the x-digital-to-analog converter is applied to the level setting amplifier 44 to be amplified and applied to the summing amplifier for the purpose described previously.

The output of the pulse count totalizer is applied to another digital-to-analog converter 60, similar to the digital-to-analog converter 58. This one is designated as the y-digital-to-analog converter. The outputs of both the x-digital-to-analog converter and the y-digital-to-analog converter are both applied to x–y plotting apparatus 62. This is commercially purchasable apparatus which draws a curve in response to the inputs received from the respective x and y digital-to-analog converters. If digital print out information is also desired, then a digital printer 64 has its two inputs respectively connected to the outputs of the time count totalizer 54 and pulse count totalizer 56. The digital printer prints two numbers. One represents the count in the time count totalizer and adjacent thereto a number representative of the count in the pulse count totalizer.

Of course, operation of the embodiment of the invention may be initiated manually. For automatically starting the apparatus shown in the drawing, a start signal, prerecorded with the waveforms 10A, 12A in the respective cyclic sources may be employed. These are sensed and are applied to an Or gate 18. The output of the Or gate is applied to the preset interval counter 50, the pulse count totalizer 56 and the time count totalizer 54 to enable them to start operation.

The preset interval counter 50 commences to count in response to the sampling pulses. The pulse count totalizer in response to the photomultiplier produces a count total representative of the duration of the maximum amplitude level of the waveforms over the initial scan cycle.

When the preset interval counter has completed its first predetermined count, it applies an output to the time count totalizer 54 causing it to advance one count. Upon advancing one count, the time count totalizer applies a reset signal to the pulse count totalizer causing it to start counting anew. The output of the time count totalizer is converted by means of the x-digital-to-analog converter to the first step of the stair-step voltage 44A. The x–y plotter produces a mark representative of its input analog signal. Likewise, the digital printer 64 produces a print out consisting of two numbers representative of the count in the time count totalizer and pulse count totalizer.

The preset interval counter then commences counting again a predetermined number of counts in response to the output from the crystal oscillator. The photomultiplier generates a number of pulses representative of the duration of the waveforms 10A, 12A at a second amplitude level over the predetermined interval. Again, when the preset interval counter completes a predetermined count, the time count totalizer is advanced one count with the result that the pulse count totalizer is reset.

The operation described above continues until the preset interval counter has completed its predetermined number of counts a predetermined number of times. It then provides a stop signal as an output to the time count totalizer and pulse count totalizer. At this time, after the output advancing the time count totalizer has occurred and after the requisite operation of the digital printer and the x–y plotter has been completed, the time count totalizer is reset by the stop signal and the pulse count totalizer is reset and stopped. The apparatus has then completed an analysis of the waveforms which were recorded in the first and second cyclic sources of waveform signals.

There has accordingly been described and shown hereinabove a novel and useful system for measuring the amplitude distribution of a time function. The accuracy of the system is considerably improved over that of other known systems. Effectively the detail of an analysis can be varied by varying the number of steps in the stair-step waveform which is generated which in turn can be determined by the number of times the preset interval counter is allowed to count the predetermined number of counts. Also, the accuracy of the analysis can be determined by the number of samples which are taken, which in turn is generated or determined by the frequency of the crystal oscillator. As a result, a system with a greatly improved accuracy over prior known systems is provided. Furthermore, the frequency range of the analysis is extended over that of the prior known systems.

What is claimed is:

1. Apparatus for measuring the amplitude distribution of a time function which is represented by the waveform of an electrical signal comprising means for repetitively reproducing said electrical signal, means to which the output of said means for reproducing said electrical signal repetitively is applied for successively increasing the amplitude of said electrical signal by a fixed amount during each repetition of said electrical signal, means for sampling the output of said last-named means for the presence of a predetermined amplitude level and producing pulses during each sample for each occurrence of said predetermined amplitude level, means for counting said pulses, and means for recording the count achieved over each cycle of repetition of said electrical signal.

2. Apparatus for measuring the amplitude distribution of a time function which is represented by the waveform of an electrical signal comprising summing means for producing a resultant output signal in response to two input signals, means for applying said electrical signal repetitively over successive predetermined intervals as one input to said summing amplifier, means for generating a stair-step voltage having the duration of each step equal to the duration of each said predetermined interval, means for applying said stair-step voltage as a second input to said summing amplifier, means to which the output of said summing amplifier is applied for sampling said output at a predetermined level and generating pulses representative of the number of samples present at said predetermined level, means for counting the pulses produced over each predetermined interval, and means for utilizing the total count for each predetermined interval.

3. Apparatus as recited in claim 2 wherein said means for sampling the output of said summing amplifier for the presence of a predetermined amplitude therein and generating pulses representative thereof comprises a cathode ray oscillograph including a cathode ray tube having cathode ray beam generating means, a screen, control means for preventing the cathode ray beam generated by said cathode ray beam generating means from reaching said screen, and coordinate deflection means, means for applying said summing means signal to said coordinate deflection means, pulse generating means, means for applying said pulse generating means output to said beam control means for permitting said electron beam to reach said screen in the presence of a pulse, a mask mounted over said screen surface, said mask having an aperture in the center thereof to permit light output from said screen to be perceived, and photomultiplier means positioned adjacent said screen for receiving the light output therefrom and for generating a pulse in response thereto.

4. Apparatus for measuring the amplitude distribution of a time function represented as an electrical signal waveform comprising means for cyclically reproducing said electrical signal, a pulse generator, means for counting pulse outputs from said pulse generator over the interval of a cycle of reproduction of said electrical signal and for producing an output indicative thereof, first counter means responsive to said output to increase its count, first digital-to-analog converter means responsive to the output of said first counter means to provide an analog voltage having an amplitude representative thereof, summing means for adding said electrical signal and said analog voltage, means for sampling the output of said summing means for the presence of a predetermined amplitude voltage at intervals determined by said pulse generator and producing indicating pulse outputs indicative of the occurrence thereof, second counter means for counting said indicating pulse outputs, means for resetting said second counter means to an initial count responsive to each change in the count of said first counter means, and means for utilizing the counts of said first and second counter means at each count of said first counter means.

5. Apparatus as recited in claim 4 wherein said means for sampling the output of said summing means for the presence of a predetermined amplitude during each pulse output of said pulse generator comprises a cathode ray oscilloscope having a cathode ray tube including a screen, cathade ray beam generating means, control means for preventing said cathode ray beam generated by said cathode ray beam generating means from reaching said screen, deflecting means for deflecting said cathode ray beam along one coordinate, and a mask having a hole in the center thereof, said mask covering all of said screen to prevent light from being emitted therefrom except over the region of said central aperture, means for applying pulses from said pulse generating means to said control means to enable said cathode ray beam to reach said screen during the interval thereof, and means to apply the output of said summing means to said deflecting means.

6. Apparatus for measuring the joint amplitude distribution of two time functions represented as a first and second electrical signal waveform comprising first and second means for cyclically reproducing said first and second electrical signals, a pulse generator, means for counting pulse outputs from said pulse generator over the interval of a cycle of reproduction of said electrical signal and for producing an output indicative thereof, first counter means responsive to said output to increase its count, first digital-to-analog converter means responsive to the output of said first counter means to provide an analog voltage having an amplitude representative thereof, first and second summing means for respectively adding said first and second electrical signals to said analog voltage, means for jointly sampling the outputs of said first and second summing means for the presence of a predetermined amplitude voltage at intervals determined by said pulse generator and producing indicating pulse outputs indicative of the occurrence thereof, second counter means for counting said indicating pulse outputs, means for resetting said second counter means to an initial count responsive to each change in the count of said first counter means, and means for utilizing the counts of said first and second counter means at each count of said first counter means.

7. Apparatus as recited in claim 6 wherein said means for jointly sampling the outputs of said first and second summing means for the presence of a predetermined amplitude during each pulse output of said pulse generator comprises a cathode ray oscilloscope having a cathode ray tube including a screen, cathode ray beam generating means, control means for preventing said cathode ray beam generated by said cathode ray beam generating means from reaching said screen, deflecting means for deflecting said cathode ray beam along one coordinate, and a mask having a hole in the center thereof, said mask covering all of said screen to prevent light from being emitted therefrom except over the region of said central aperture, means for applying pulses from said pulse generating means to said control means to enable said cathode ray beam to reach said screen during the interval thereof, and means to apply the output of said summing means to said deflecting means.

8. Apparatus for measuring the amplitude distribution of a time function represented by the amplitude variations of an electrical signal extending over a predetermined interval comprising means for repetitively reproducing said electrical signal, means for generating a stair-step voltage having a stair-step waveform, the duration of each step of said stair-step waveform extending over the interval of said electrical signal and the amplitude of each step being predetermined, said means for generating a stair-step voltage comprising a pulse generator, a preset counter, means for applying pulses from said pulse generator to said preset counter to be counted, means for presetting said preset counter to produce an output pulse when it has counted pulses from said pulse generator over an interval equal to the interval of said electrical signal, a first counter, means for applying output from said preset interval counter to said first counter to advance the count thereof, digital-to-analog converter means responsive to the count of said first counter for producing a stair-step voltage representative thereof, summing means to which said signal voltage and stair-step voltage are applied for producing the sum thereof, cathode ray tube means to which the output of said summing means and of said pulse generator are applied for displaying light pulses during the interval of a pulse from said pulse generator whenever the output of said summing means is at a predetermined amplitude level, photomultiplier means for producing pulse outputs responsive to light pulses produced by said cathode ray tube means, a second counter, means for applying the output of said photomultiplier means to said second counter to be counted, means for resetting said second counter responsive to each count change of said first counter, and means for utilizing the count outputs of said first and second counters.

9. Apparatus as recited in claim 8 wherein said cathode ray tube means to which the output of said summing means and of said pulse generator are applied for displaying light pulses during the interval of a pulse from said pulse generator whenever the output of said summing means is at a predetermined level includes a mask having a central aperture therein, said cathode ray tube means having a screen on which said light pulses are displayed, said mask being positioned over said screen and between it and said photomultiplier means.

References Cited by the Examiner

UNITED STATES PATENTS

| 2,733,358 | 1/1956 | Carapellotti. |
| 2,752,589 | 6/1956 | DeLong. |
| 2,836,356 | 5/1958 | Forrest et al. |
| 3,122,732 | 2/1964 | Lewinstein et al. ____ 324—77 X |

OTHER REFERENCES

"Test Apparatus," I.B.M. Technical Disclosure Bulletin, vol. 2, No. 4, pp. 56–57 (December 1959).

WALTER L. CARLSON, *Primary Examiner.*

P. F. WILLE, *Assistant Examiner.*